United States Patent
Inoue et al.

(10) Patent No.: US 8,265,834 B2
(45) Date of Patent: Sep. 11, 2012

(54) SENSOR SYSTEM FOR VEHICLE

(75) Inventors: Satoru Inoue, Tokyo (JP); Yukio Nishimoto, Tokyo (JP); Junya Tashiro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 426 days.

(21) Appl. No.: 12/677,581

(22) PCT Filed: Oct. 29, 2008

(86) PCT No.: PCT/JP2008/003095
§ 371 (c)(1),
(2), (4) Date: Mar. 11, 2010

(87) PCT Pub. No.: WO2009/090695
PCT Pub. Date: Jul. 23, 2009

(65) Prior Publication Data
US 2010/0286875 A1 Nov. 11, 2010

(30) Foreign Application Priority Data
Jan. 16, 2008 (JP) .................................. 2008-006890

(51) Int. Cl.
*G06F 7/00* (2006.01)
(52) U.S. Cl. ........................ 701/49; 340/435; 340/932.2
(58) Field of Classification Search ............ 701/49, 701/300, 301; 340/435, 932.2, 436, 437, 340/506, 903, 904, 933, 937, 943; 367/93; 180/274, 167, 199; 73/579, 627
See application file for complete search history.

(56) References Cited

U.S. PATENT DOCUMENTS

| | | | |
|---|---|---|---|
| 6,856,044 B2 * | 2/2005 | Ries-Mueller | 307/10.2 |
| 6,999,003 B2 * | 2/2006 | Matsukawa et al. | 340/932.2 |
| 7,739,046 B2 * | 6/2010 | Satonaka et al. | 701/300 |
| 2005/0285758 A1 | 12/2005 | Matsukawa et al. | |

FOREIGN PATENT DOCUMENTS

| | | |
|---|---|---|
| JP | 58-58483 A | 4/1983 |
| JP | 4-145389 A | 5/1992 |
| JP | 10-100795 A | 4/1998 |
| JP | 2006-7875 A | 1/2006 |

* cited by examiner

*Primary Examiner* — Thomas Black
*Assistant Examiner* — Marthe Marc-Coleman
(74) *Attorney, Agent, or Firm* — Birch, Stewart, Kolasch & Birch, LLP

(57) ABSTRACT

A sensor system has object detection sensors 4 which are mounted on door mirrors 2 and have a parking space search mode for searching for an object within ranges extending laterally from a vehicle 14, and a vehicle monitoring mode for searching for an object in rear lateral sides of the vehicle 14 by folding and retracting the door mirrors 2; and a control section 7 for causing the object detection sensors 4 to be driven when the vehicle 14 travels at a speed equal to or less than a prescribed value, and for making a search frequency of the object detection sensors 4 higher in the parking space search mode than in the vehicle monitoring mode.

17 Claims, 12 Drawing Sheets

(a)

(b)

(a)

(b)

(a)

(b)

SENSOR SYSTEM FOR VEHICLE

TECHNICAL FIELD

The present invention relates to a sensor system for a vehicle which carries out parking space detection and vehicle monitoring with sensors fixed to door mirrors.

BACKGROUND ART

As a conventional system for detecting an object around a vehicle with sensors fixed to the door mirrors, a monitoring system for a vehicle disclosed in Patent Document 1 is known, for example. The system operates as a vehicle monitoring system by detecting the following vehicle and the like in a blind spot of the door mirrors during traveling, or by monitoring an object at rear lateral sides of the vehicle during parking with ultrasonic sensors fixed to the door mirrors.

Patent Document 1: Japanese Patent Laid-Open No. 10-100795/1998.

The conventional system always sets the detection areas of the ultrasonic sensors fixed to the door mirrors diagonally behind the vehicle. For this reason, although it can detect the following vehicle in the blind spot of the door mirrors while the vehicle is traveling, it cannot search for a parking space where the vehicle is to be parked.

In addition, the conventional system forms the detection areas of the ultrasonic sensors at rear lateral sides of the vehicle by folding and retracting the door mirrors when the vehicle is stopped. This enables the same ultrasonic sensors fixed to the door mirrors to detect an object at the rear lateral sides of the vehicle. The conventional system, however, cannot alter the search frequency or search range of the ultrasonic sensors in accordance with the difference in the operation mode when the vehicle is running or stopped or in accordance with the result of the vehicle monitoring, thereby being unable to operate the sensors efficiently.

For example, at parallel parking, it is not necessary to continuously drive the sensors throughout traveling, but to operate the sensors when the vehicle reduces its speed for searching for a parking space. In addition, it is necessary to detect the parking space accurately by increasing the detection range and broadening the directivity angle of the sensors and by increasing the search frequency. On the other hand, in the case of using as the vehicle monitoring system while the vehicle is stopped, unlike the case of searching for the parking space, it is not necessary to drive the sensors frequently, but is enough that the surroundings of the vehicle are within the search range so that a remote unnecessary obstacle is not detected.

The present invention is implemented to solve the foregoing problems. Therefore it is an object of the present invention to provide a sensor system for a vehicle capable of searching for a parking space during running and capable of vehicle monitoring while the vehicle is stopped by using the sensors fixed to the door mirrors, and capable of operating the sensors efficiently in accordance with the difference in the operation mode when the vehicle is running or stopped, or in accordance with the result of the vehicle monitoring.

DISCLOSURE OF THE INVENTION

The sensor system for a vehicle in accordance with the present invention has an object detection sensor which is mounted on a door mirror and has a first search mode for searching for an object using a range extending laterally from a vehicle as a detection area, and a second search mode for searching for an object using a rear lateral side of the vehicle as a detection area by folding and retracting the door mirror; and a control section for causing the object detection sensor to be driven when the vehicle travels at a speed equal to or less than a prescribed value, and for making a search frequency of the object detection sensor higher in the first search mode than in the second search mode.

According to the present invention, since it searches for an object in the range extending laterally from the vehicle by driving the object detection sensor mounted on the door mirror when the vehicle travels at the speed equal to or less than the prescribed value, it can search for a parking space of the vehicle. In addition, when the vehicle is stopped and the door mirror is folded and retracted, since it searches for an object using the rear lateral side of the vehicle as the detection area, it can operate as a vehicle monitoring system when the vehicle is stopped. In addition, it can detect the parking space accurately because it searches for the parking space at a higher search frequency than in the vehicle monitoring, and can achieve power saving in the vehicle monitoring mode, thereby offering an advantage of being able to drive the object detection sensor efficiently.

BEST MODE FOR CARRYING OUT THE INVENTION

The best mode for carrying out the invention will now be described with reference to the accompanying drawings to explain the present invention in more detail.

Embodiment 1

Figure 1:
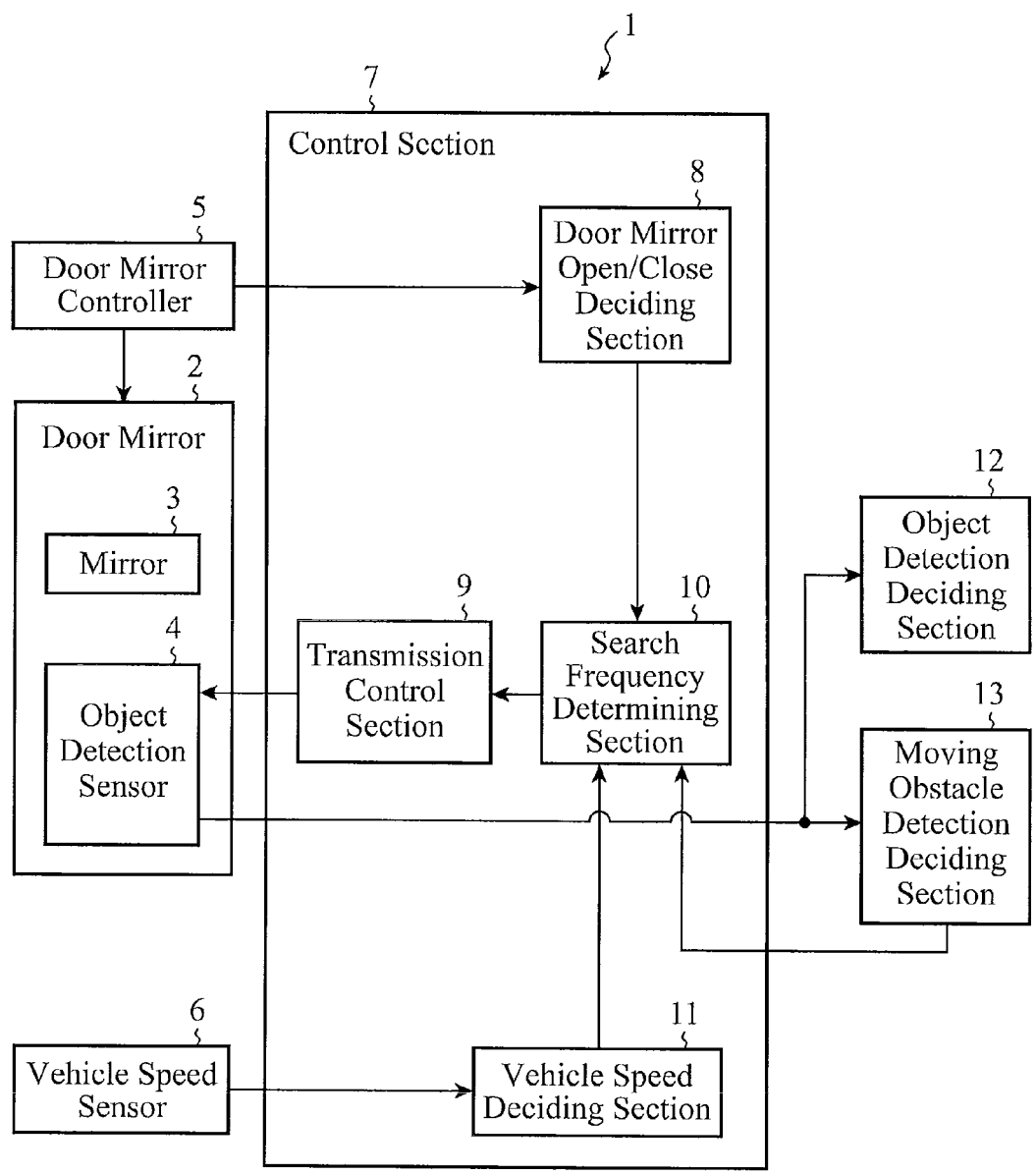
FIG. 1 is a block diagram showing a configuration of a sensor system for a vehicle of an embodiment 1 in accordance with the present invention.

FIG. 1 is a block diagram showing a configuration of a sensor system for a vehicle of an embodiment 1 in accordance with the present invention. In FIG. 1, the sensor system 1 for a vehicle of the embodiment 1 includes an object detection sensor 4, a door mirror controller 5, a vehicle speed sensor 6, a control section 7, an object detection deciding section 12 and a moving obstacle detection deciding section 13.

A door mirror 2 is mounted on both sides of a vehicle, and has a mirror 3 and the object detection sensor 4 mounted thereon to compensate for a field of vision diagonally behind the vehicle. In addition, the door mirror 2 has a driving mechanism not shown which includes a driving motor and the like, and can be folded toward the side of the vehicle by the driving control of the door mirror controller 5. In the following, a state in which the door mirrors 2 are folded is referred to as a closed state, and a state in which the door mirrors 2 are placed at a normal position at which they are raised from the closed state and are projected from the side of the vehicle is referred to as an open state.

The object detection sensors 4 are sensors for detecting an object by transmitting a search signal and by receiving its reflected signal, and are fixed to the door mirrors 2. The object detection sensors 4 start their search in response to a search command input from a transmission control section 9, and transmit a search result to the object detection deciding section 12 and moving obstacle detection deciding section 13. As the object detection sensors 4, ultrasonic sensors, optical sensors, radio usage sensors are conceivable, for example. The following description will be made by way of example using the ultrasonic sensors as the object detection sensors 4.

Incidentally, the ultrasonic sensors have, as their detection areas, attainable regions of the ultrasonic waves transmitted as search signals, and detect an object by receiving ultrasonic waves reflected from the object within the detection areas. Transmitting ultrasonic waves from the ultrasonic sensors starts a single search, and the number of times of the transmission of the ultrasonic waves in a prescribed time period becomes a search frequency.

The door mirror controller 5 controls open/close driving of the door mirrors 2 in response to a driving command input from the outside. The driving command is transmitted to the door mirror controller 5 in response to a button switch operable by a driver or to an off operation of the ignition key. In addition, the driving command input to the door mirror controller 5 is also transmitted from the door mirror controller 5 to a door mirror open/close deciding section 8. The vehicle speed sensor 6 is a sensor for detecting a vehicle speed. Incidentally, the vehicle speed sensor 6 may be a wheel speed sensor for detecting the rotation speed of wheels.

The control section 7, which is a functional component of an electronic control unit (ECU) mounted on the vehicle, includes the door mirror open/close deciding section 8, the transmission control section 9, a search frequency determining section 10 and a vehicle speed deciding section 11. The door mirror open/close deciding section 8 makes an open/close decision of the door mirrors 2 in response to the driving command input from the door mirror controller 5. The transmission control section 9 transmits a search command (measurement request pulse) to the object detection sensors 4 at the timing conforming to the search frequency decided by the search frequency determining section 10.

The search frequency determining section 10 decides the search frequency of the object detection sensors 4 in accordance with the decision results of the door mirror open/close deciding section 8, vehicle speed deciding section 11 and moving obstacle detection deciding section 13. For example, receiving the decision results that the door mirrors 2 are open and the vehicle is traveling at a prescribed slow speed, the search frequency determining section 10 decides a search frequency higher than a prescribed value for performing detection processing of a parking space.

In contrast, when the door mirrors 2 are closed and the vehicle is stopped at a speed of 0 km/h, the search frequency determining section 10 considers as a vehicle monitoring mode and decides a search frequency lower than the prescribed value. Even after the decision is made, if a moving obstacle is detected, the search frequency determining section 10 switches the search frequency to a higher value.

The vehicle speed deciding section 11 decides as to whether the vehicle is traveling at the prescribed slow speed or less or is stopped (0 km/h) from the detection result of the vehicle speed sensor 6. Incidentally, when the speed of the vehicle is about 30 km/h or less, the vehicle speed deciding section 11 makes a decision that it is the prescribed slow speed traveling for shifting to the search mode for a parking space.

The object detection deciding section 12, which is a functional component of the electronic control unit mounted on the vehicle, detects a parking space from the search results of the object detection sensors 4. For example, when carrying out parallel parking, the object detection deciding section 12 obtains the distance between other vehicles by deciding edge positions of the parked vehicles from the search results successively input from the object detection sensors 4. If the distance is enough for the vehicle to park, the object detection deciding section 12 shows the driver as a parking space decision result via a presenting means not shown.

The moving obstacle detection deciding section 13, which is a functional component of the electronic control unit mounted on the vehicle, detects an obstacle from the search results of the object detection sensors 4, and decides as to whether it is a moving obstacle or not. If it detects a moving obstacle, the moving obstacle detection deciding section 13 notifies the search frequency determining section 10. In response to it, the search frequency determining section 10 increases the search frequency of the object detection sensors 4, thereby being able to continuously search for a moving obstacle accurately which can be a trespasser approaching the vehicle.

Figure 2:
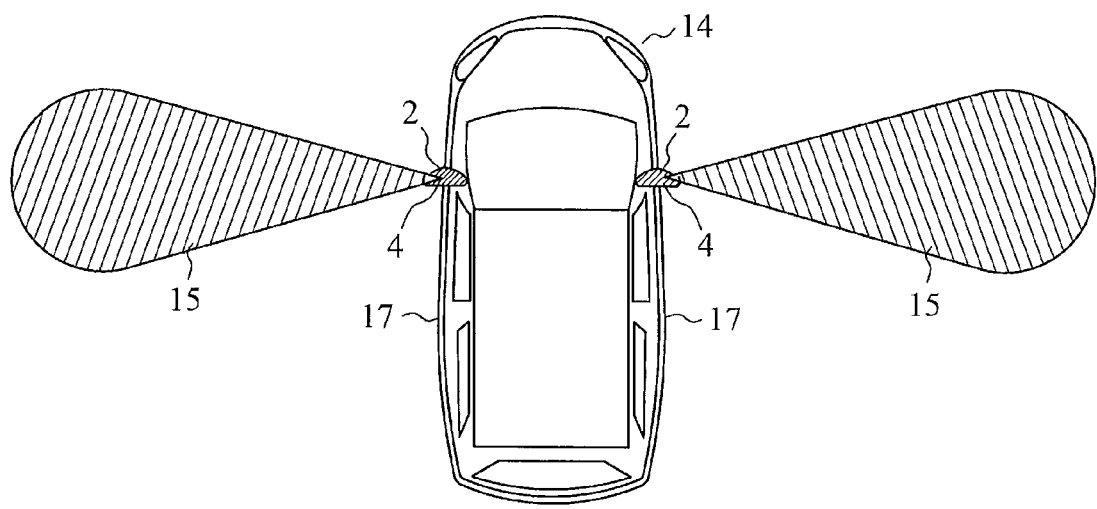
FIG. 2 is a diagram showing detection areas of object detection sensors in FIG. 1.
Figure 2:
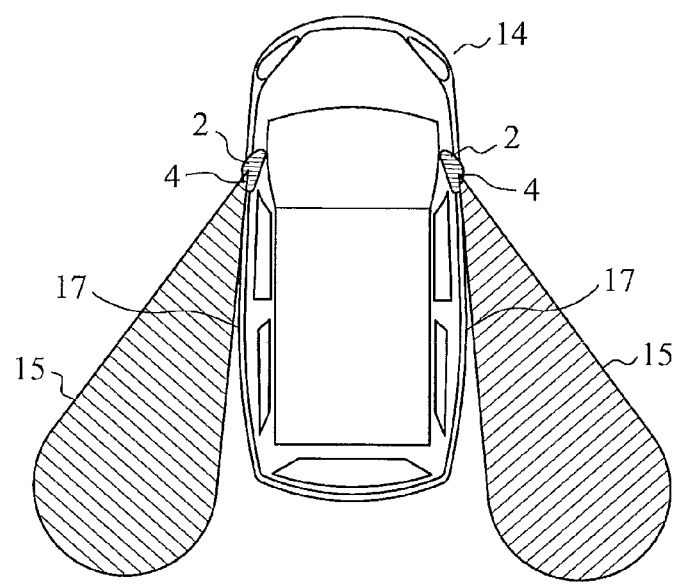

FIG. 2 is a diagram showing detection areas of the object detection sensors in FIG. 1: FIG. 2(a) shows detection areas during traveling; and FIG. 2(b) shows detection areas when the vehicle is stopped. As shown in FIG. 2(a), during traveling of the vehicle 14, the door mirrors 2 are in an open state (normal position). In this case, detection areas 15 of the object detection sensors 4 are formed in ranges laterally extending from the vehicle 14 rather than diagonally behind the vehicle as in conventional cases. In this state, a search for a parking space is carried out (first search mode).

When the vehicle 14 is stopped, the door mirrors 2 are folded and retracted (closed state). In this case, the object detection sensors 4 mounted on the casings of the door mirrors 2 look behind the vehicle 14. This will cause the detection areas 15 to move so that they are formed at rear lateral sides (side body 17 sides) of the vehicle 14 as shown in FIG. 2(b).

In this state, a vehicle monitoring mode (second search mode) is set so that the detection decision of a moving obstacle is made.

Next, the operation will be described.

(1) Search for Parking Space

Figure 3:
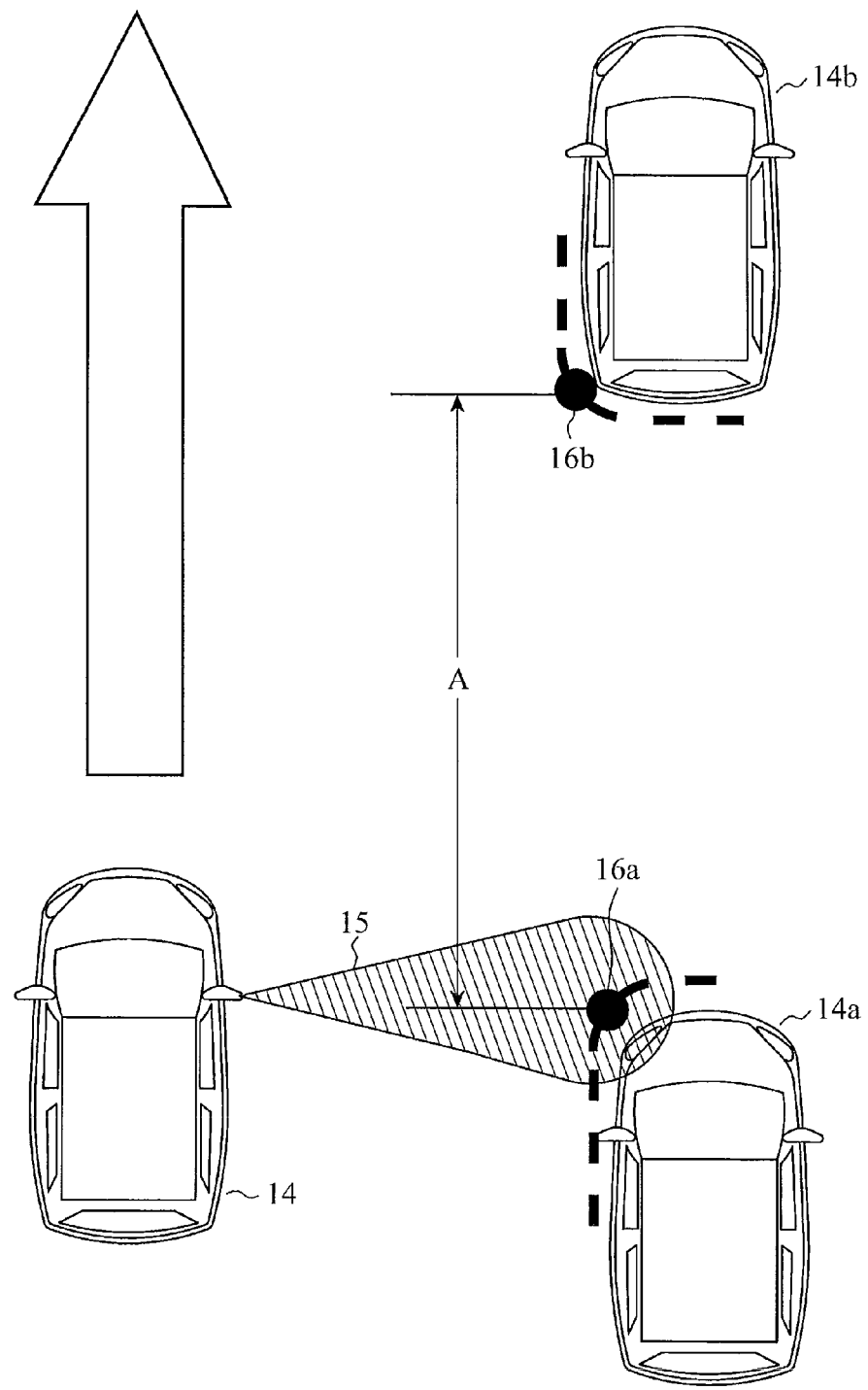
FIG. 3 is a diagram explaining detection of a parking space by the sensor system for a vehicle in FIG. 1.

FIG. 3 is a diagram for explaining search processing for a parking space by the sensor system for a vehicle in FIG. 1. In FIG. 3, vehicles 14a and 14b are other vehicles parking at the roadside. It shows a case of parallel parking of a vehicle 14 between the vehicles 14a and 14b. The vehicle 14 is assumed to be traveling in the arrow direction in FIG. 3.

When the search frequency determining section 10 recognizes from the decision results of the door mirror open/close deciding section 8 and vehicle speed deciding section 11 that the door mirrors 2 are in the open state and the vehicle 14 is traveling at the prescribed slow speed or less (about 30 km/h or less), it determines the search frequency (high frequency) corresponding to the search mode for a parking space, and notifies the transmission control section 9. The transmission control section 9 transmits a search command to the object detection sensors 4 at the timing corresponding to the search frequency sent from the search frequency determining section 10. Receiving the search command (measurement request pulse) from the transmission control section 9, the object detection sensors 4 start driving, and begin the search at the search frequency decided by the search frequency determining section 10.

Here, the object detection sensor 4 transmits ultrasonic waves as a search signal and receives a reflected signal of the ultrasonic waves reflected from an obstacle. The object detection deciding section 12 obtains the distance to the obstacle from the transmitting timing of the ultrasonic waves by the object detection sensor 4 and the received timing of the reflected signal of the ultrasonic waves. Portions denoted by broken lines in FIG. 3 show ultrasonic wave reflecting areas about the vehicles 14a and 14b.

When carrying out the search with the object detection sensor 4 while driving the vehicle 14, from the side body of the vehicle 14a as shown by a broken line in FIG. 3, a distance profile that indicates a nearly constant distance across the vehicles 14 and 14a is obtained. After passing by an edge portion 16a by further driving the vehicle 14, it will shift to the search using the front part of the vehicle 14a as the reflecting area, and when the vehicle 14a gets out of the detection area 15, significant distance detection based on the reflected signal from the vehicle 14a cannot be carried out. This makes it possible to obtain the distance profile to the lateral part and front part of the vehicle 14a as shown in FIG. 3. According to the distance profile about the vehicle 14a thus obtained, the object detection deciding section 12 determines the position of the edge portion 16a of the vehicle 14a.

By further driving the vehicle 14, a search using a rear part of the vehicle 14b as a reflecting area is carried out, and after passing by an edge portion 16b, it will shift to the search using the side body of the vehicle 14b as the reflecting area so that a distance profile that indicates a nearly constant distance between the vehicles 14 and 14b is obtained. According to the distance profile about the vehicle 14b thus obtained, the object detection deciding section 12 determines the position of the edge portion 16b of the vehicle 14b.

After that, according to the positions of the edge portions 16a and 16b, the object detection deciding section 12 obtains the distance A between the edge portions 16a and 16b, and decides as to whether the parking is possible or not by comparing the distance A with the size necessary for parking the vehicle 14 itself. When a decision is made that the parking is possible between the vehicles 14a and 14b, the object detection deciding section 12 shows the driver the parking space decision result indicating that via a presenting means not shown. Another configuration is also possible which automatically assists the driver in accordance with the parking space decision result.

Incidentally, although there is conventionally a system for searching for a parking space using a sensor mounted on a bumper of the vehicle, using the sensor fixed to the door mirror at the position higher than the bumper as in the present invention makes it possible to detect the outermost edge of a vehicle such as a truck with a high floor.

(2) Vehicle Monitoring While Vehicle is Stopped

When the driver stops the vehicle 14, the vehicle speed deciding section 11 notifies the search frequency determining section 10 that the vehicle 14 makes a stop (speed 0 km/h). On the other hand, receiving the driving command after the stop of the vehicle 14, the door mirror controller 5 brings the door mirrors 2 into a closed state. Incidentally, it is conceivable that the driving command is input in response to the button switch operation of the driver or to the turning off of the ignition key. When the door mirror open/close deciding section 8 decides that the door mirrors 2 are brought into the closed state, it notifies the search frequency determining section 10 of that.

When the search frequency determining section 10 recognizes from the decision results of the door mirror open/close deciding section 8 and vehicle speed deciding section 11 that the vehicle 14 is stopped and the door mirrors 2 are in the closed state, it determines the search frequency (low frequency) corresponding to the vehicle monitoring mode, and notifies the transmission control section 9. The transmission control section 9 transmits the search command to the object detection sensors 4 at the timing corresponding to the search frequency sent from the search frequency determining section 10. This causes the object detection sensors 4 to start the search at the search frequency decided by the search frequency determining section 10.

In this case, because of the folding and retracting of the door mirrors 2 as shown in FIG. 2(b), the detection areas 15 of the object detection sensors 4 move to the rear lateral sides (side body 17 sides) of the vehicle 14. This state brings about a vehicle monitoring mode so that the moving obstacle detection deciding section 13 makes a detection decision of a moving obstacle by inputting a result every time the search by the object detection sensors 4 is carried out.

When the object detection sensor 4 detects the obstacle, the moving obstacle detection deciding section 13 successively receives the detection result of the obstacle at each search, detects the dynamic behavior of the obstacle from the result of comparing the detection result of the past search with the detection result of the current search, and decides whether the obstacle is a moving obstacle or not. In addition, when making a decision of the moving obstacle, the moving obstacle detection deciding section 13 can make a decision as to whether the moving obstacle is approaching the vehicle 14 or not from the difference between the current and previous results by obtaining the distance to the obstacle from the detection results of the object detection sensor 4.

(3) Optimization of Search Frequency

The search frequency determining section 10 decides the search frequency of the object detection sensors 4 in accordance with the decision results of the door mirror open/close deciding section 8, vehicle speed deciding section 11 and moving obstacle detection deciding section 13.

Figure 4:
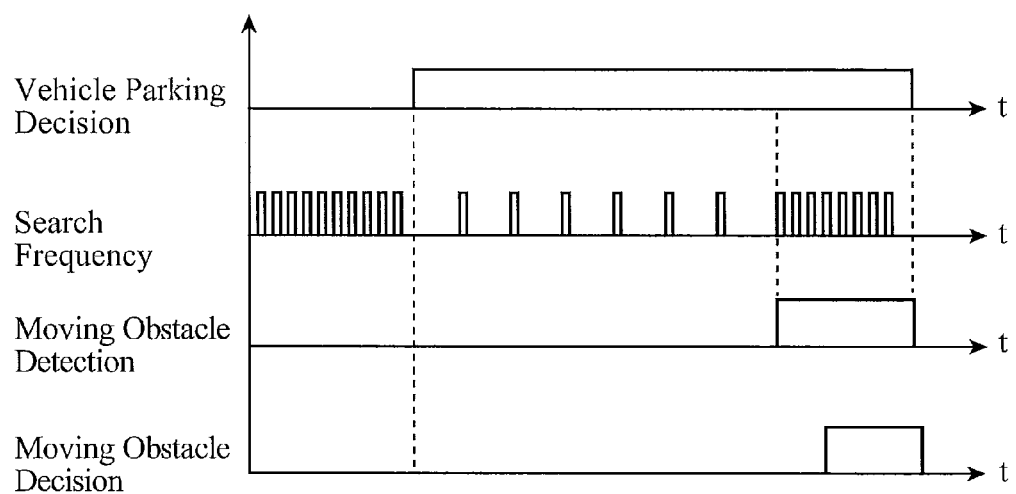
FIG. 4 is a diagram showing a search frequency in each processing of a vehicle parking decision, moving obstacle detection and moving obstacle decision in time series.

FIG. 4 is a diagram showing search frequencies in each processing of the vehicle parking decision, moving obstacle detection and moving obstacle decision in a time series. The vehicle parking decision shown in FIG. 4 is a decision signal transmitted from the vehicle speed deciding section 11 to the search frequency determining section 10, and is turned on when the vehicle 14 is stopped (speed 0 km/h). While the decision signal of the vehicle speed deciding section 11 is kept off, the sensor system for a vehicle 1 is working in the search mode for the parking space and carries out the search at the high search frequency as shown in FIG. 4.

After that, when the parking of the vehicle 14 is completed after detecting the parking space, the decision signal of the vehicle speed deciding section 11 is turned on. This will cause the search frequency determining section 10 to make the search frequency lower than that in the search mode for the parking space as shown in FIG. 4. In this way, the sensor system for a vehicle 1 shifts to a vehicle monitoring mode.

The moving obstacle detection shown in FIG. 4, which is a detection signal transmitted from the moving obstacle detection deciding section 13 to the search frequency determining section 10, is turned on when the object detection sensor 4 detects a moving obstacle. When the detection signal is turned on, the search frequency determining section 10 increases the search frequency even in the vehicle monitoring mode as illustrated in FIG. 4.

The moving obstacle decision shown in FIG. 4, which is a decision signal transmitted from the moving obstacle detection deciding section 13 to the search frequency determining section 10, is turned on when the moving obstacle detected by the object detection sensor 4 is a significant moving obstacle. The term "significant moving obstacle" refers to a person or the like approaching the vehicle 14 except for a static obstacle exhibiting dynamic behavior such as branches and leaves of a tree swaying in the wind. When the decision signal is turned on, the search frequency determining section 10 maintains the search frequency increased by the moving obstacle detection as illustrated in FIG. 4. Thus, the search for the moving obstacle is continued at the high frequency.

Incidentally, although not shown in the drawing, if a decision is made that the moving obstacle detected by the object detection sensor 4 is not a significant moving obstacle (if the decision signal is off), it is also possible to return the search frequency increased by the detection of the moving obstacle to the low search frequency in the vehicle monitoring mode.

In addition, although FIG. 4 shows a case where the search frequency is increased when the moving obstacle is detected, a configuration is also possible which increases the search frequency when a decision is made, after detecting the moving obstacle, that the moving obstacle is further approaching the vehicle 14.

As described above, according to the embodiment 1, since it includes the object detection sensors 4 which are fixed to the door mirrors 2 and have the search mode for the parking space for searching for an object using the ranges extending laterally from the vehicle 14 as the detection areas 15 and the vehicle monitoring mode for searching for an object using the rear lateral sides of the vehicle 14 as the detection areas 15 by folding and retracting the door mirrors 2, and the control section 7 for driving the object detection sensors 4 when the vehicle 14 is traveling at the vehicle speed less than the prescribed value, and for making the search frequency of the object detection sensors 4 higher in the search mode for the parking space than in the vehicle monitoring mode, it can carry out, using the object detection sensors 4 mounted on the door mirrors 2, the search for the parking space during traveling and the vehicle monitoring when the vehicle is stopped, and can change the search frequency of the object detection sensors 4 in accordance with the difference in the operation mode during traveling or being stopped, or in accordance with the result of the vehicle monitoring. This makes it possible to expect to improve durability of the object detection sensors 4 and to reduce power consumption.

In addition, although the embodiment 1 does not refer to the mounting positions of the object detection sensors 4 on the door mirrors 2 or the search direction of the object detection sensors 4, they can be dealt with as follows.

Figure 5:
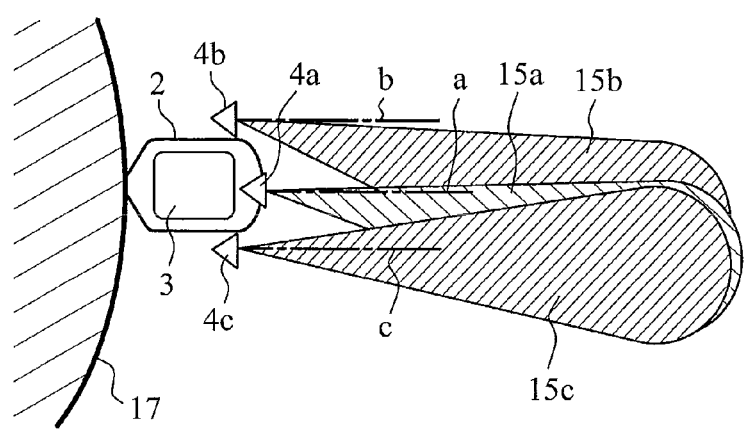
FIG. 5 is a diagram showing a manner of mounting an object detection sensor.

FIG. 5 is a diagram showing a manner of mounting the object detection sensor. As shown in FIG. 5, it can be mounted on at least one of the tip of the body of the door mirror 2 (object detection sensor 4a), its top (object detection sensor 4b) and its bottom (object detection sensor 4c).

Furthermore, the centerlines of the search direction of the object detection sensors 4a-4c are inclined downward so that the detection areas 15a-15c are sloped toward a road surface. This enables detecting the shoulder of a road simultaneously with the search for a parking space, thereby making it possible to detect the depth of the parking space and to detect the parking space more accurately.

Figure 6:
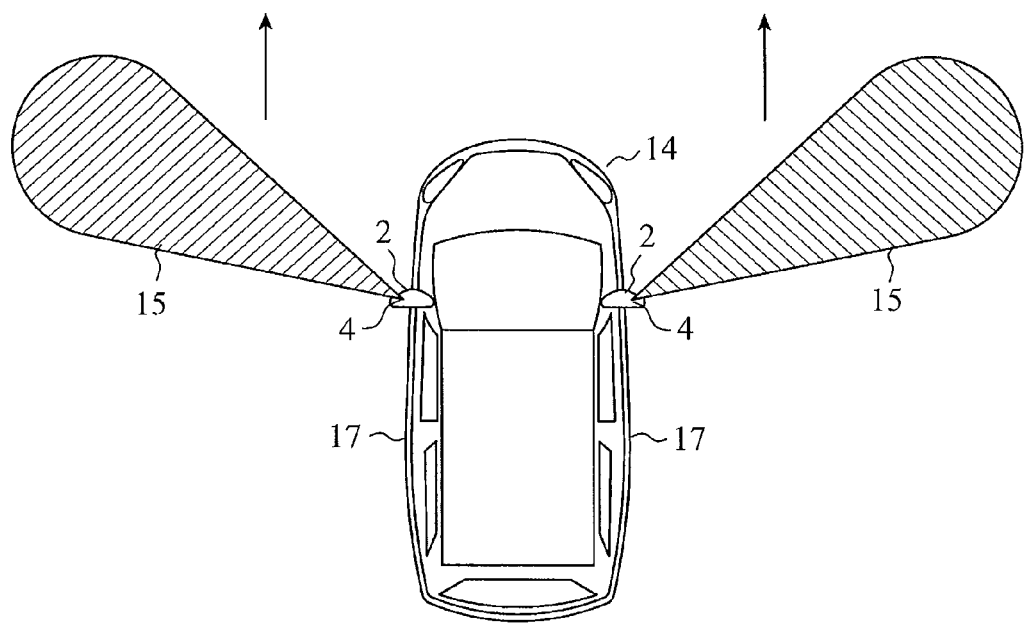
FIG. 6 is a diagram showing modes of search directions of the object detection sensors.
Figure 6:
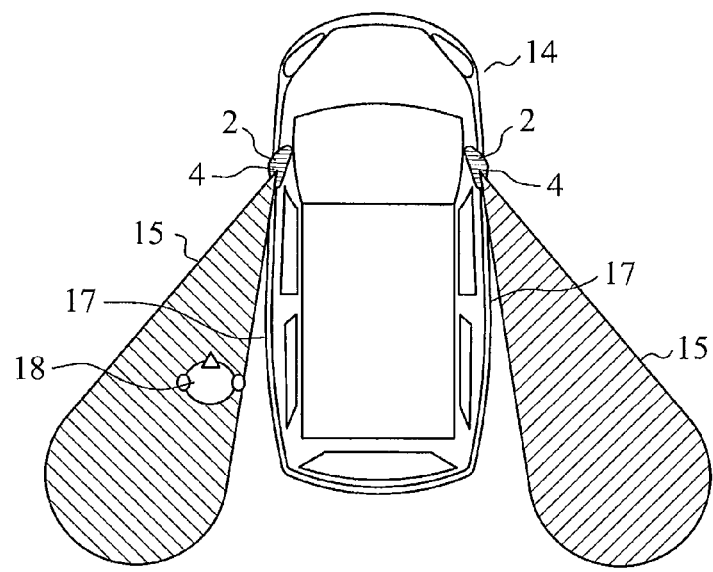

FIG. 6 is a diagram showing a mode of the search directions of the object detection sensors: FIG. 6($a$) shows detection areas during running; and FIG. 6($b$) shows detection areas when the vehicle is stopped. As shown in FIG. 6($a$), when the vehicle 14 is traveling, the door mirrors 2 are in the open state (at normal position). In this case, the centerlines of the search of the object detection sensors 4 are made facing more frontward than the door mirrors 2. In this way, the ranges which face more frontward than the door mirrors 2 (the traveling direction side denoted by arrows in FIG. 6($a$)) and extend obliquely from the vehicle 14 become the detection areas 15.

On the other hand, when the door mirrors 2 are made closed state, the detection areas 15 shift to the rear lateral sides (side body 17 sides) of the vehicle 14. In this case, since the centerlines of the search directions of the object detection sensors 4 are inclined forward of the vehicle 14, unlike the case of FIG. 2($b$), the detection areas 15 are formed separately from the side body 17 without overlapping it. In this state, it becomes the vehicle monitoring mode, and a search decision of a moving obstacle 18 like a person is carried out.

When the centerlines of the search directions of the object detection sensors 4 are made facing forward of the vehicle 14, the search for a parking space is carried out in the detection areas 15 facing front lateral direction of the vehicle 14. This makes it possible to detect during running an obstacle ahead more quickly than when the detection areas extend at right angles from the vehicle 14.

In addition, the detection areas 15 facing forward of the vehicle 14 enable increasing the reflecting area of an obstacle ahead. This makes it possible to detect the obstacle ahead more accurately during running. This will be described by way of example of the parallel parking shown in FIG. 3. Since the reflecting area of the search signal as to the vehicle 14$b$ ahead of the vehicle 14 increases, the distance profile near the rear part of the vehicle 14$b$ to the edge portion 16$b$ can be obtained more accurately.

In the parallel parking, since the vehicle 14 is reversed, the driver is apt to disregard the distance to an obstacle ahead rather than to an object behind the vehicle 14. For this reason, providing (with a warning or the like) the driver with the distance profile near the rear part to the edge portion 16$b$ of the vehicle 14$b$ enables effective parking support.

Furthermore, in the vehicle monitoring mode when the vehicle is stopped, since the detection areas 15 are separated from the side body 17 without being overlapped, the reception of unnecessary reflected signals from the side body 17 of the vehicle 14 can be reduced. This makes it possible to suppress the formation of the dead zones due to the reception of the unnecessary reflected signals.

Figure 7:
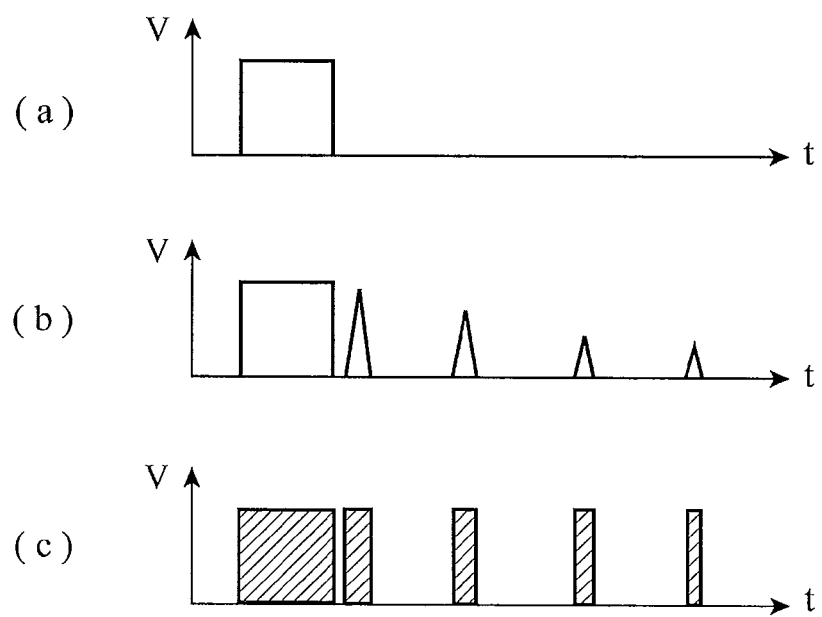
FIG. 7 is a diagram explaining occurrence of a dead zone of the object detection sensor.

FIG. 7 is a diagram explaining the occurrence of a dead zone of the object detection sensor. FIG. 7(a) shows the signal reception of the object detection sensor 4 in a time series when there is no unnecessary reflected signal from the side body 17. Without any unnecessary reflected signals, the object detection sensor 4 receives only the reflected signal from the obstacle to be searched for.

If there are unnecessary reflected signals from the side body 17 of the vehicle 14 as shown in FIG. 7(b), the object detection sensor 4 receives the unnecessary reflected signals from the side body 17 besides the reflected signal from the object to be searched for. As for a configuration that uses a single transmission and reception section in common as both the transmission of the search signal and reception of the reflected signal, it cannot receive any other signals while it is receiving the unnecessary reflected signals. In addition, even if a transmitting section and a receiving section are provided separately, if the unnecessary reflected signals go round to the receiving side, it cannot receive any other signals.

For this reason, while the object detection sensor 4 is receiving the unnecessary reflected signals as shown in FIG. 7(c), it becomes the time domain of the dead zone in which the moving obstacle that is approaching the vehicle 14 cannot be detected. Accordingly, forming the detection areas 15 at the positions that do not overlap with the side body 17 makes it possible to reduce the search defect resulting from the reception of the unnecessary reflected signals from the side body 17.

Embodiment 2

Although the foregoing embodiment 1 shows a case which alters the search frequency that defines the search range of the object detection sensor, the present embodiment 2 alters the detection range and directivity angle that define the search range of the object detection sensors in accordance with the difference in the operation mode of the system during running and at a stop.

In addition, although the basic configuration of the sensor system for a vehicle of the embodiment 2 is the same as that of FIG. 1 described in the foregoing embodiment 1, it differs in altering the search range in accordance with the operation mode of the system during running and at rest owing to the structure of the object detection sensors and owing to the operation control of the object detection sensors by the transmission control section. In the following, the configuration of the embodiment 2 will be described with reference to FIG. 1 as well.

As for the alteration of the search range of the object detection sensors 4, the detection range of the object detection sensors 4 is increased and their directivity angle is broadened in the search mode for the parking space during running. In contrast, in the vehicle monitoring mode when the vehicle is stopped, the detection range is reduced and the directivity angle is narrowed. The ultrasonic waves (search signal waves) emitted from the object detection sensors 4 are radiated with a conical expanse as shown in FIG. 8.

Figure 8:
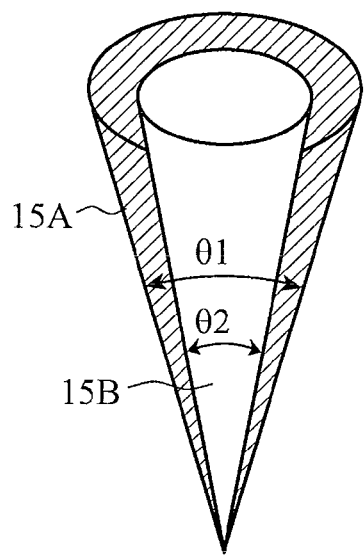
FIG. 8 is a diagram showing a search range of object detection sensors of an embodiment 2.
Figure 9:
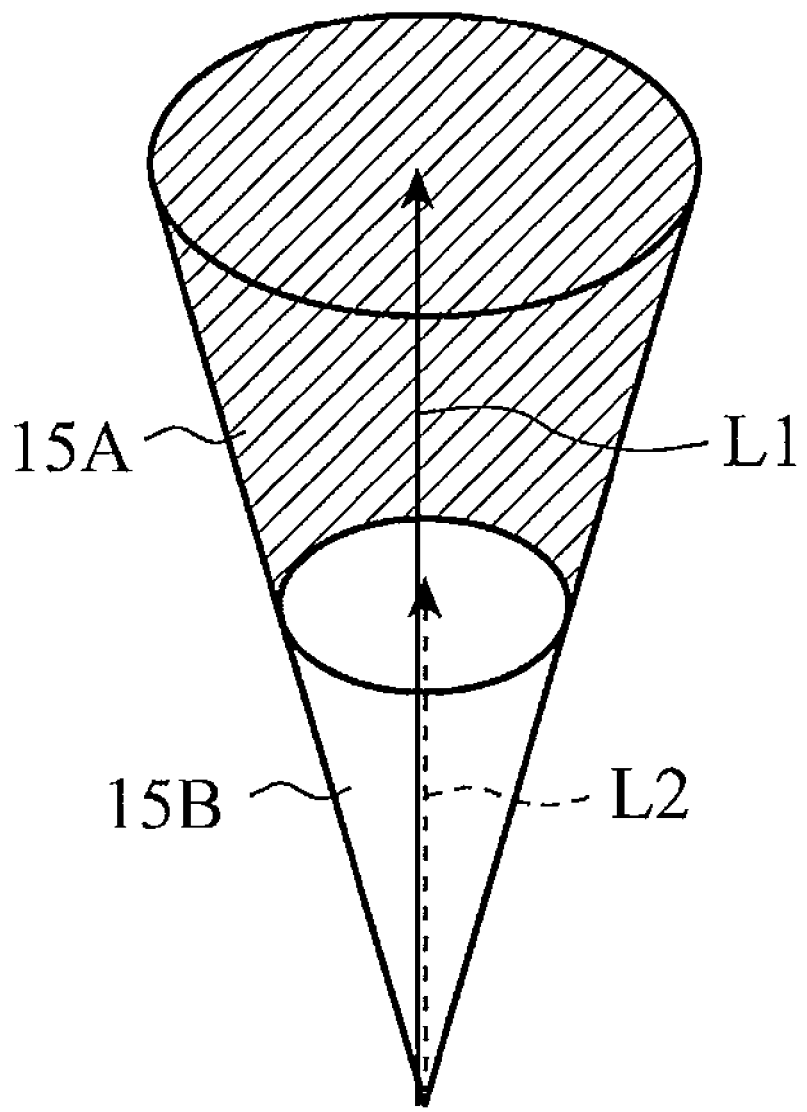
FIG. 9 is a diagram showing a search range of the object detection sensors of the embodiment 2.

The present embodiment 2 employs, as shown in FIG. 8, a detection area 15A with the directivity angle θ1 in the search mode for the parking space during running, and a detection area 15B with a directivity angle θ2 (θ1>θ2) in the vehicle monitoring mode when the vehicle is stopped. In addition, as shown in FIG. 9, it employs a detection area 15A with a detection range L1 in the search mode for the parking space during running, and a detection area 15B with a detection range L2 (L1>L2) in the vehicle monitoring mode when the vehicle is stopped.

In this way, in the search mode for the parking space, it can search for an obstacle in a broader search range from a distance from the vehicle 14, thereby being able to detect the parking area more accurately. In addition, in the vehicle monitoring mode, it is enough to detect a significant moving obstacle (like a person) approaching the vehicle 14 at rest. For this reason, narrowing the search range as described above makes it possible to suppress the reception of the unnecessary reflected signals, to reduce the consumption power of the transmission, and to operate the object detection sensors 4 more efficiently.

Next, the altering operation of the search range will be described.

(1) Alteration of Directional Angle of Ultrasonic Waves Defining Search Range

Figure 10:
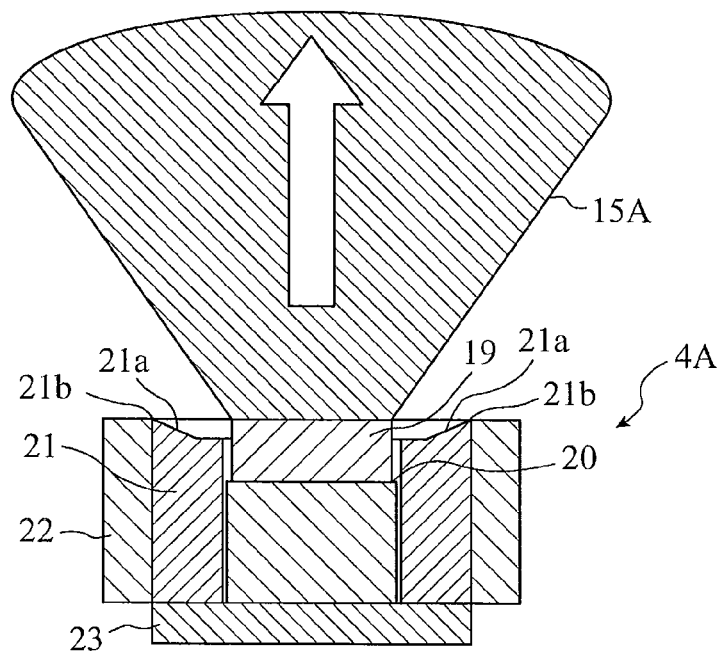
FIG. 10 is a cross-sectional view showing a structure of the object detection sensors of the embodiment 2.
Figure 10:
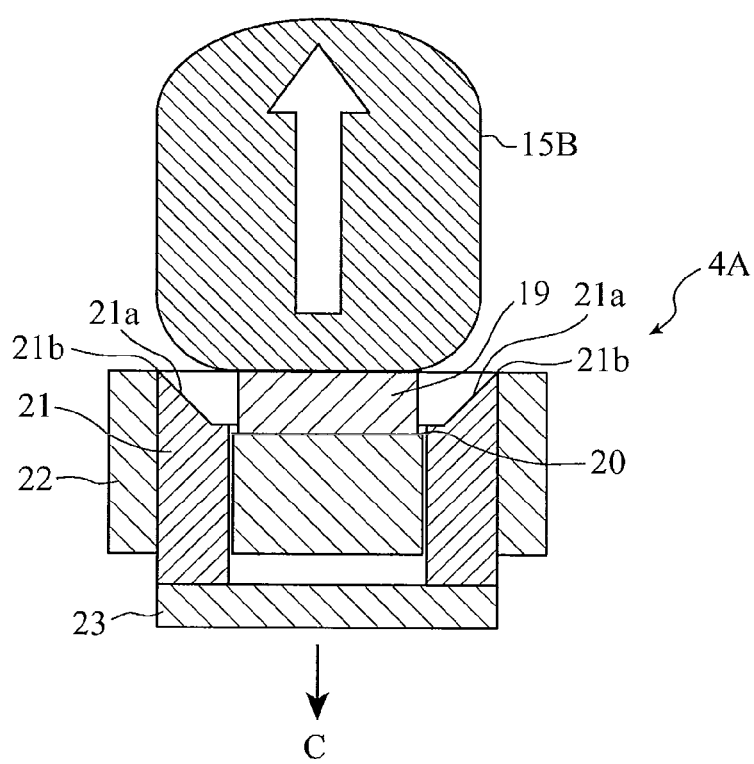

FIG. 10 is a cross-sectional view showing a structure of the object detection sensor capable of altering the directivity angle of ultrasonic waves: FIG. 10(a) shows a case of a broad directivity angle; and FIG. 10(b) shows a case of narrow directivity angle. The object detection sensor 4A shown in FIG. 10 has a structure including a ultrasonic sensor unit 20 having an oscillator 19 for generating ultrasonic waves and a reflecting mechanism 21 composed of an elastic member contained in a cylindrical case 22. The ultrasonic sensor unit 20 is fixed at a position along the traveling direction of the ultrasonic waves denoted by an arrow outline with a blank inside in FIG. 10 with a supporting member not shown.

The reflecting mechanism 21, which has a cylindrical shape having its outer circumference stuck to the inner wall of the case 22, contains the ultrasonic sensor unit 20 in its opening formed along the cylinder axis. The end face of the case 22 on the oscillator 19 side is nearly on the same plain as the radiation surface of the ultrasonic waves of the oscillator 19. In addition, on the end face of the reflecting mechanism 21 on the oscillator 19 side, a gradient 21a is formed which declines toward the oscillator 19 so that it can reflect the ultrasonic waves emitted from the oscillator 19. Furthermore, the outer circumference 21b of the end face of the reflecting mechanism 21 on the oscillator 19 side is fixed to the case 22.

A retracting mechanism 23, which is a mechanism for retracting the reflecting mechanism 21 in the C direction in FIG. 10(b), can be implemented using a motor or electromagnet, for example. Incidentally, the retracting mechanism 23 retracts the reflecting mechanism 21 about 1.5-2.0 mm.

In the case of FIG. 10(a), the reflecting mechanism 21 is not retracted by the retracting mechanism 23, and the angle of inclination of the gradient 21a is small. When the ultrasonic waves are emitted from the oscillator 19 in this state, the ultrasonic waves spread in the direction of the arrow in FIG. 10(a), thereby forming a detection area 15A with broad directivity. Thus, in the search mode for the parking space, the object detection sensor 4A is set in the state of FIG. 10(a) to carry out the search.

On the other hand, when the retracting mechanism 23 retracts the reflecting mechanism 21, since the outer circumference 21b is fixed to the case 22, the reflecting mechanism 21 extends as shown FIG. 10(b) because of the elasticity, thereby making the angle of inclination of the gradient 21a sharper. When the ultrasonic waves are emitted from the oscillator 19 in this state, the ultrasonic waves are reflected off the gradient 21a and go forward, thereby forming a detection area 15B with narrow directivity traveling in the direction of the arrow in FIG. 10(b). Thus, in the vehicle monitoring mode, the object detection sensor 4A is set in the state of FIG. 10(b) to carry out the search.

The structure of FIG. 10(b) can make the directivity of the ultrasonic waves sharper by optimizing the angle of inclination of the gradient 21a by adjusting the amount of retraction of the retracting mechanism 23. This makes it possible to improve the detection accuracy of the object detection sensor 4A in the vehicle monitoring mode.

In addition, the directivity angle of the ultrasonic waves the object detection sensors 4 transmit can be altered as follows.

The directivity of the ultrasonic waves can be adjusted using the transmission frequency as a parameter. For example, in the case of a circular oscillator, the directivity of the ultrasonic waves can be obtained by the following expression (1), where $\theta$ is a directivity angle, k is a constant, $\lambda$ is the wavelength of the ultrasonic waves, and D is a diameter of the oscillator. In addition, denoting the speed of sound by C, and the oscillation frequency by f, then $\lambda = C/f$.

$$\theta = \tan^{-1}(k \cdot \lambda/D) \quad (1)$$

Figure 11:
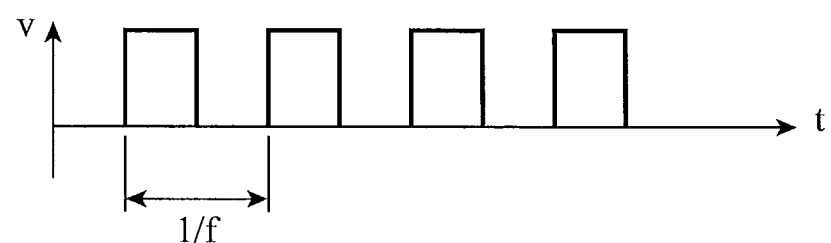
FIG. 11 is a graph showing relationships between a driving waveform and an oscillation frequency of an ultrasonic sensor.

FIG. 11 is a graph showing relationships between the driving waveform and the oscillation frequency of the ultrasonic sensor, in which the vertical axis shows the transmission voltage of the ultrasonic waves, and the horizontal axis shows time. As shown in FIG. 11, the object detection sensor 4 transmits the ultrasonic waves by driving at a period 1/f in accordance with a search command (measurement request pulse) from the transmission control section 9. In the foregoing expression (1), the constant k and the diameter D of the oscillator are fixed, and the speed of sound C is nearly constant at the normal temperature.

The transmission control section 9 adjusts the transmitting timing of the search command according to the foregoing expression (1), thereby altering the directivity angle $\theta$ of the ultrasonic waves emitted from the object detection sensors 4. Since the method can alter the directivity of the ultrasonic waves by electrical control of the object detection sensors 4, it can control the directivity with ease.

(2) Alteration of Detection Range Defining Search Range

Figure 12:
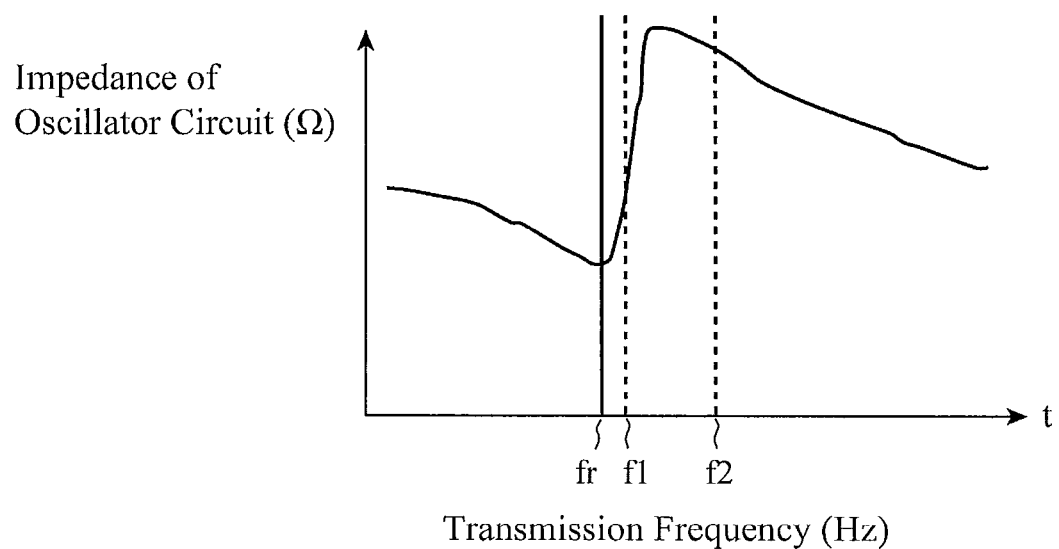
FIG. 12 is a graph showing relationships between the impedance of an oscillator circuit of the object detection sensors and transmission frequencies of ultrasonic waves.

FIG. 12 is a graph showing relationships between the impedance of the oscillator circuit of the object detection sensor and the transmission frequency of the ultrasonic waves. As shown in FIG. 12, the impedance of the oscillator circuit is minimum at the resonance frequency fr. On the other hand, at frequencies f1 and f2 other than the resonance frequency fr, the impedance is greater as shown by broken lines in FIG. 12. When driving the object detection sensors 4 at low-voltage transmission pulses, the transmission efficiency will reduce if the transmission frequency is set at the frequency f1 or f2, and the receiving level of the reflected signal becomes smaller. Thus, the detection range of the object detection sensors 4 can be reduced.

Accordingly, controlling the object detection sensors 4 by the transmission control section 9 enables them to transmit the ultrasonic waves with the transmission frequency at the resonance frequency fr in the search mode for the parking space during running, and with the transmission frequency at the frequency f1 or f2 other than the resonance frequency fr in the vehicle monitoring mode when the vehicle is stopped. This makes it possible to extend the detection range of the object detection sensors 4 in the search mode for the parking space, and to reduce the detection range in the vehicle monitoring mode when the vehicle is stopped. Since the method can alter the detection range by the electrical control of the object detection sensors 4, it can simplify the control of the detection range.

Alternatively, the detection range of the object detection sensors 4 can be altered as follows.

Figure 13:
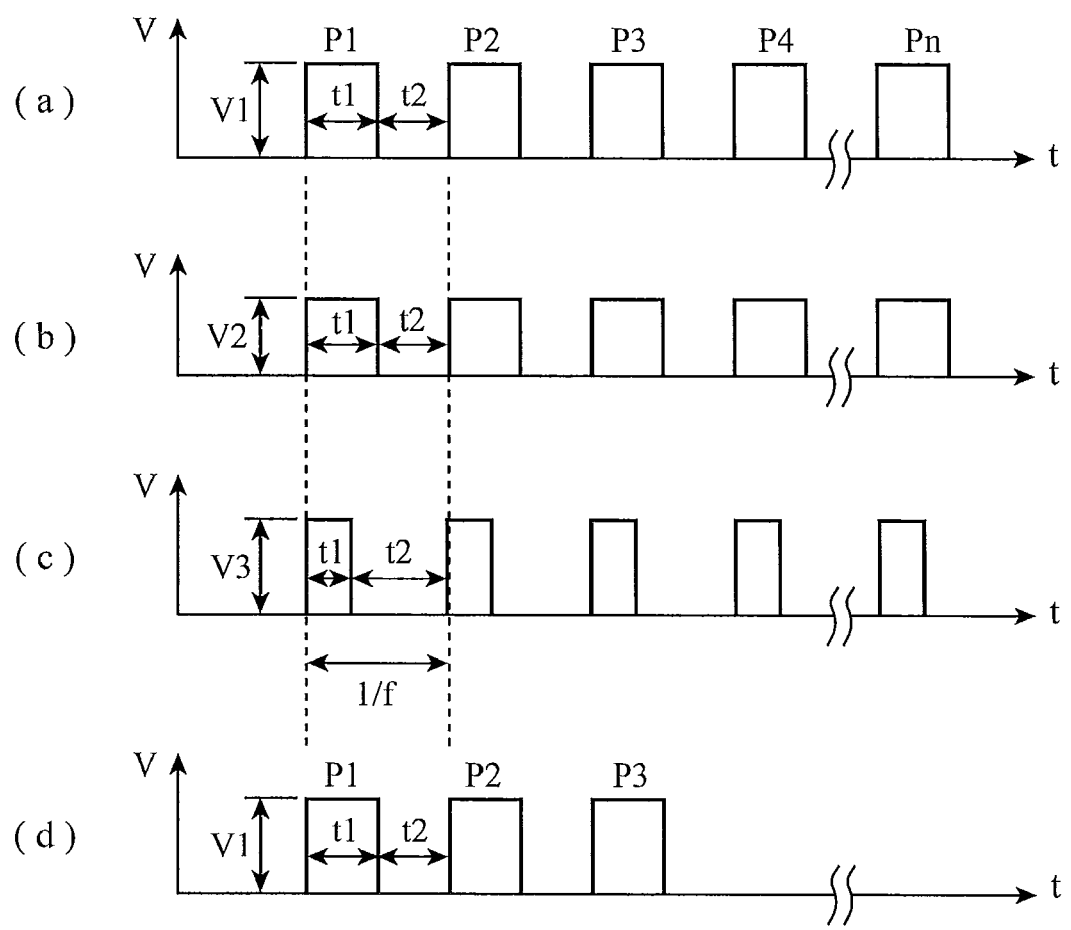
FIG. 13 is a diagram explaining processing of altering a detection range in accordance with the transmission voltage and a transmission pulse width of the ultrasonic waves.

FIG. 13 is a diagram for explaining the processing of altering the detection range by the transmission voltage and transmission pulse width of the ultrasonic waves, and shows the driving waveform of the ultrasonic sensors. FIG. 13(a) shows the driving waveform as to which the transmission efficiency of the ultrasonic waves is optimized, in which the transmission voltage of ultrasonic waves is V1, the transmission pulse width is t1, and the transmission pulse interval is t2. The relationships maximize the detection range of the object detection sensors 4.

FIG. 13(b) shows a case where the transmission voltage is reduced as compared with the case shown in FIG. 13(a) (V1>V2). Such control can decrease the transmission efficiency of the ultrasonic waves emitted from the object detection sensors 4, thereby being able to reduce the received level of the reflected signal. In other words, it can decrease the detection range of the object detection sensors 4.

In addition, FIG. 13(c) shows a case where the transmission pulse width t1 is reduced as compared with the case shown in FIG. 13(a). Incidentally, the transmission voltage V3 is nearly the same as V1. Such control can also decrease the transmission efficiency of the ultrasonic waves emitted from the object detection sensors 4, thereby being able to reduce the detection range.

Furthermore, FIG. 13(d) shows a case where the number of the transmission pulses is reduced as compared with the case shown in FIG. 13(a) (Pn>P3). Such control can also decrease the transmission efficiency of the ultrasonic waves emitted from the object detection sensors 4, thereby being able to reduce the detection range.

Controlling the object detection sensors 4 by the transmission control section 9 enables them to be driven with the relationship shown in FIG. 13(a) in the search mode for the parking space during running, and with one of the relationships from FIG. 13(b) to FIG. 13(d) in the vehicle monitoring mode when the vehicle is stopped. Since the method can vary the detection range of the object detection sensors 4 by the electrical control, it can simplify the control of the detection range.

As described above, according to the present embodiment 2, the control section 7 alters the search range of the object detection sensors 4 in accordance with the difference in the search mode for the parking space and the vehicle monitoring mode, and particularly makes the directivity narrower and the detection range shorter in the vehicle monitoring mode than in the search mode for the parking space. This makes it possible to search for an obstacle in a broader search range from a greater distance in the search mode for the parking space during running, thereby being able to detect the parking area more accurately during running. In addition, narrowing the search range in the vehicle monitoring mode can suppress the reception of the unnecessary reflected signals and reduce the consumption of the transmission power, thereby being able to operate the object detection sensors 4 more efficiently.

Embodiment 3

Figure 14:
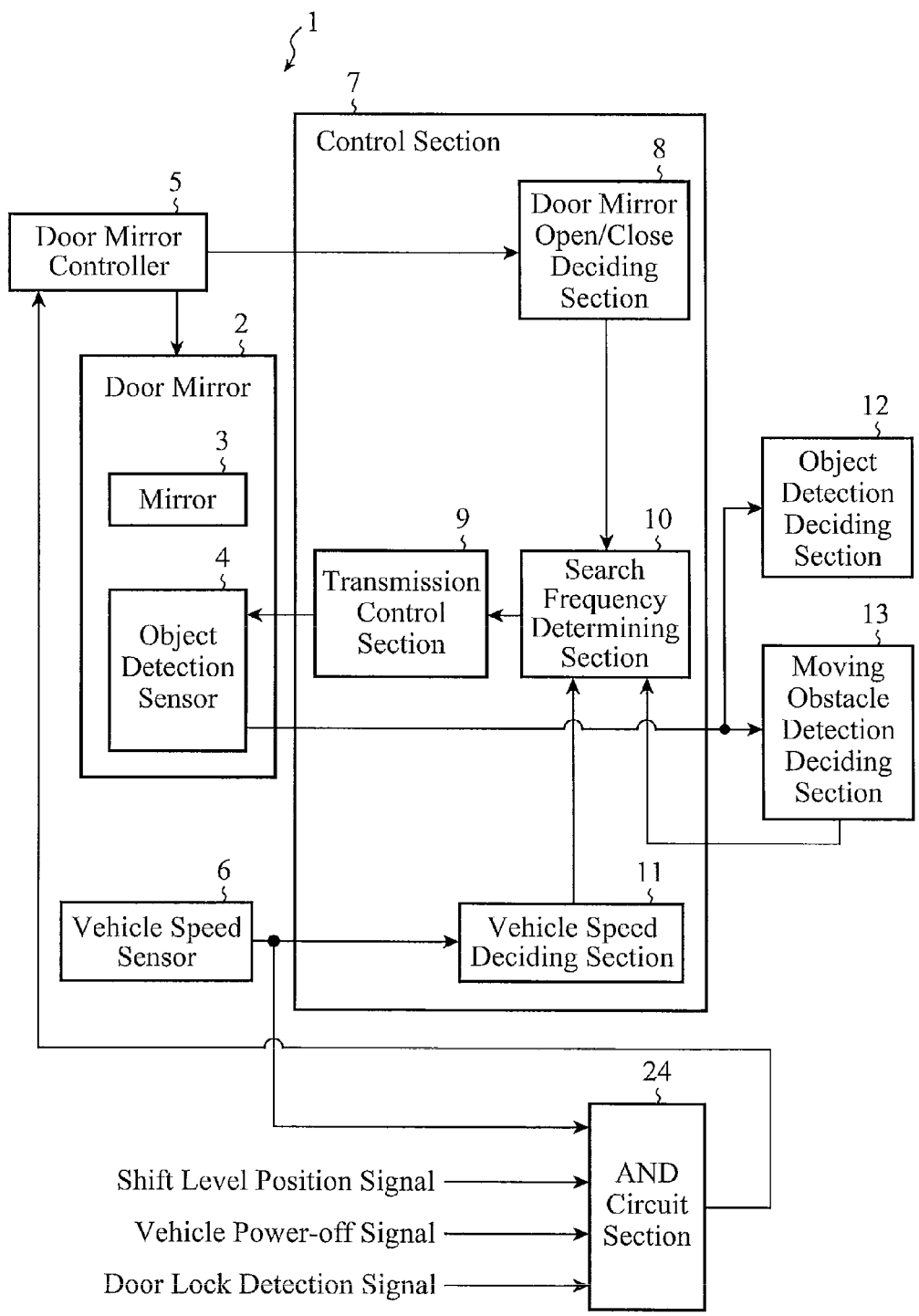
FIG. 14 is a block diagram showing a configuration of a sensor system for a vehicle of an embodiment 3 in accordance with the present invention.

FIG. 14 is a block diagram showing a configuration of a sensor system for a vehicle of an embodiment 3 in accordance with the present invention. The sensor system for a vehicle of the embodiment 3 adds an AND circuit section (driving command informing section) 24 for deciding a parking state of the vehicle to the configuration shown in the foregoing embodiment 1. Incidentally, in FIG. 14, the same components as those of FIG. 1 are designated by the same reference numerals, and the description of them is omitted here.

The AND circuit section 24 receives the output of the vehicle speed sensor 6, a shift lever position signal, a vehicle power-off signal and a door lock detection signal, and transmits a driving command to the door mirror controller 5 when all the input signals show that the vehicle is stopped.

For example, when the vehicle speed is 0 km/h, when the shift lever is placed in the parking range, when the vehicle power is off, and when the door is locked, the output of the vehicle speed sensor 6, the shift lever position signal, the vehicle power-off signal and the door lock detection signal are assumed to be logic value 1 (true value), respectively. Thus, only when the vehicle meets all the foregoing conditions, the driving command can be transmitted to the door mirror controller 5.

Receiving the driving command from the AND circuit section 24, the door mirror controller 5 folds and retracts the door mirrors 2 (closed state) by controlling the driving mechanism.

As described above, according to the present embodiment 3, since it has the AND circuit section 24 for detecting that the vehicle 14 is stopped and for folding and retracting the door mirrors 2, it can automatically place the door mirrors 2 in the closed state in connection with the state of the vehicle, thereby being able to shift to the vehicle monitoring mode without fail.

Embodiment 4

Figure 15:
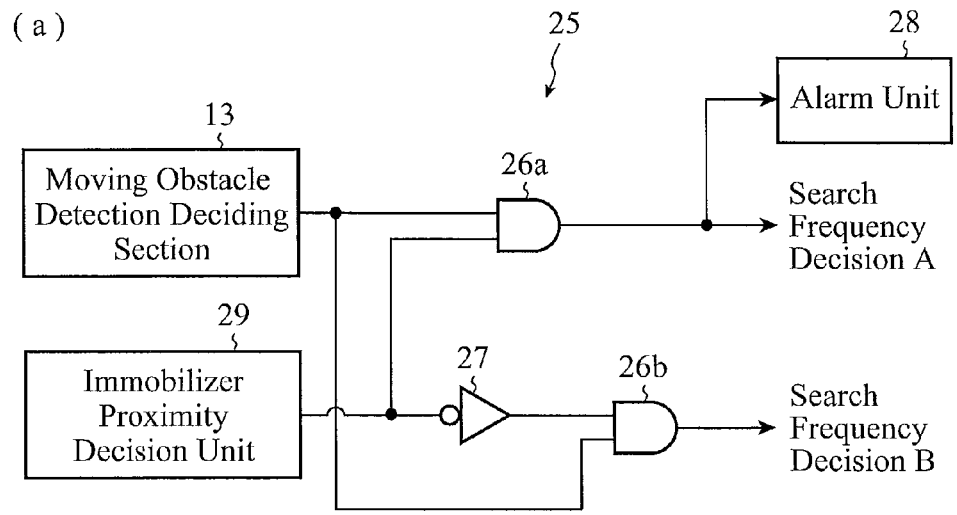
FIG. 15 is a diagram showing a combination deciding section of a sensor system for a vehicle of an embodiment 4 in accordance with the present invention.
Figure 15:
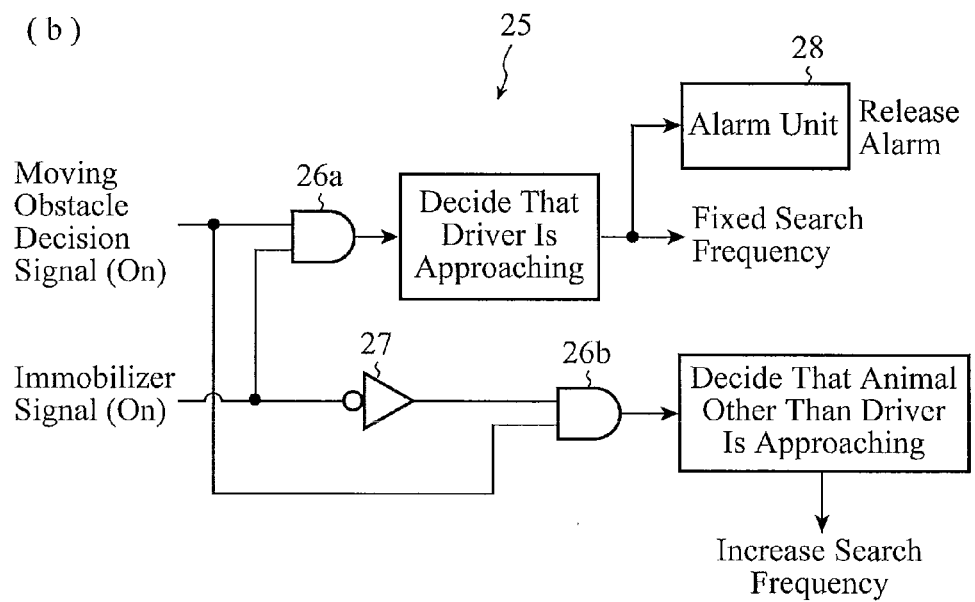

FIG. 15 is a diagram showing a combination deciding section of a sensor system for a vehicle of an embodiment 4 in accordance with the present invention. Being added to the configuration of FIG. 1 described in the foregoing embodiment 1, a combination deciding section 25 combines a decision result of a moving obstacle and a proximity decision result of an immobilizer, and makes a decision as to the issue or release of an alarm and as to the search frequency.

The combination deciding section 25 has AND circuits 26a and 26b and a NOT circuit 27 as shown in FIG. 15(*a*). The AND circuit 26a has its input side connected to the moving obstacle detection deciding section 13 and to an immobilizer proximity decision unit 29, and its output to an alarm unit 28 and the search frequency determining section 10. The NOT circuit 27 has its input side connected to the immobilizer proximity decision unit 29, and its output connected to the AND circuit 26b. The AND circuit 26b has its input side connected to the output of the NOT circuit 27 and the moving obstacle detection deciding section 13, and has its output connected to the search frequency determining section 10.

The moving obstacle detection deciding section 13 outputs a logic value 1 (true value) as the decision signal of a moving obstacle when it decides that the moving obstacle detected by the object detection sensors 4 is a significant moving obstacle. In this case, if the immobilizer proximity decision unit 29 decides the proximity of the immobilizer embedded in a private key of the driver, it outputs a logic value 1 (true value) as an immobilizer signal.

In this case, the output of the AND circuit 26a becomes logic value 1 (true value), and a decision is made that the driver approaches as shown in FIG. 15(*b*). The output value of the AND circuit 26a is delivered to the alarm unit 28, and to the search frequency determining section 10 as the search frequency decision A. Receiving the output value of the AND circuit 26a, the alarm unit 28 releases the alarm issued when the object detection sensor 4 detects the moving obstacle. In addition, receiving the search frequency decision A, the search frequency determining section 10 continues the previous low search frequency. Thus, the object detection sensors 4 continue the search at the low search frequency.

On the other hand, the AND circuit 26b receives the decision signal of the moving obstacle and the immobilizer signal via the NOT circuit 27. Accordingly, even if the immobilizer signal is logic value 0 (false value), if the decision of the moving obstacle is logic value 1 (true value), the output of the AND circuit 26b becomes logic value 1 (true value). In this case, a decision is made that an animal other than the driver approaches as shown in FIG. 15(*b*).

The decision result is delivered to the search frequency determining section 10 as the search frequency decision B. Receiving the search frequency decision B, the search frequency determining section 10 increases the search frequency, and notifies the transmission control section 9. In response to the control of the transmission control section 9, the object detection sensors 4 start the search at the high search frequency. Thus, they can detect a significant moving obstacle other than the driver accurately.

As described above, according to the present embodiment 4, since the control section 7 controls whether to issue the alarm or not and the search frequency of the object detection sensors 4 in accordance with the detection result of the moving obstacle by the moving obstacle detection deciding section 13 and the proximity of the immobilizer to the vehicle, it can prevent, by adding the proximity of the immobilizer to a decision factor, a false alarm when a decision is made that the driver is a moving obstacle.

INDUSTRIAL APPLICABILITY

As described above, since the sensor system for a vehicle in accordance with the present invention is configured in such a manner as to include the object detection sensors which are fixed to the door mirrors and have the first search mode for searching for an object using the ranges extending laterally from the vehicle as the detection areas and the second mode for searching for an object using the rear lateral sides of the vehicle as the detection areas by folding and retracting the door mirrors, and the control section for driving the object detection sensors and for making the search frequency of the object detection sensors higher in the first search mode than in the second search mode when the vehicle is traveling at the vehicle speed less than the prescribed value, it can detect the parking space accurately because it searches for the parking space at the higher search frequency than in the vehicle monitoring, can achieve power saving in the vehicle monitoring mode, and can drive the object detection sensors efficiently. Accordingly, it is suitably applied to the sensor system for a vehicle mounted on the door mirrors.

What is claimed is:

1. A sensor system for a vehicle comprising:
an object detection sensor which is mounted on a door mirror, and has a first search mode for searching for an object using a range extending laterally from a vehicle as a detection area, and a second search mode for searching for an object using a rear lateral side of the vehicle as a detection area by folding and retracting the door mirror; and
a control section for causing the object detection sensor to be driven when the vehicle travels at a speed equal to or less than a prescribed value, and for making a search frequency of the object detection sensor higher in the first search mode than in the second search mode.

2. The sensor system for a vehicle according to claim 1, further comprising an object detection deciding section for deciding a parking possible area by detecting an obstacle from search results successively obtained from the object detection sensor in the first search mode.

3. The sensor system for a vehicle according to claim 1, further comprising a moving obstacle detection deciding section for detecting a moving obstacle from a result of comparing a past search result with a current search result of the object detection sensor in the second search mode.

4. The sensor system for a vehicle according to claim 3, wherein the control section increases the search frequency of the object detection sensor when the moving obstacle detection deciding section detects the moving obstacle.

5. The sensor system for a vehicle according to claim 3, wherein
the moving obstacle detection deciding section decides approach of the moving obstacle to the vehicle by comparing previous and current search results obtained by the object detection sensor; and
the control section increases the search frequency of the object detection sensor when the moving obstacle detection deciding section detects the moving obstacle, and decides that the moving obstacle is approaching the vehicle.

6. The sensor system for a vehicle according to claim 3, wherein
the control section controls whether to issue an alarm or not and controls the search frequency of the object detection sensor in response to the detection result of the moving obstacle by the moving obstacle detection deciding section and in response to proximity of an immobilizer to the vehicle.

7. The sensor system for a vehicle according to claim 1, wherein
the object detection sensor searches for an object downward from a horizontal plane.

8. The sensor system for a vehicle according to claim 1, wherein
the object detection sensor searches for an object using a range which faces more frontward than the door mirror and extends obliquely from the vehicle as the detection area in the first search mode.

9. The sensor system for a vehicle according to claim 1, wherein
the control section alters the search range of the object detection sensor in accordance with a difference in the first and second search modes.

10. The sensor system for a vehicle according to claim 9, wherein
the control section alters the search range by adjusting directivity of a search signal transmitted from the object detection sensor.

11. The sensor system for a vehicle according to claim 10, wherein
the control section narrows the directivity in the second search mode than in the first search mode.

12. The sensor system for a vehicle according to claim 10, wherein
the object detection sensor is a ultrasonic sensor; and
the control section adjusts the directivity of ultrasonic waves transmitted from the ultrasonic sensor in accordance with a transmission frequency of the ultrasonic waves.

13. The sensor system for a vehicle according to claim 10, wherein
the object detection sensor is a ultrasonic sensor whose horn for emitting the ultrasonic waves has a variable shape; and
the control section adjusts the directivity of the ultrasonic waves transmitted from the ultrasonic sensor by controlling the variable shape of the horn.

14. The sensor system for a vehicle according to claim 9, wherein
the control section alters the search range by adjusting the detection range of the object detection sensor.

15. The sensor system for a vehicle according to claim 14, wherein
the control section makes the detection range in the second search mode shorter than that in the first search mode.

16. The sensor system for a vehicle according to claim 14, wherein
the object detection sensor is a ultrasonic sensor; and
the control section adjusts the detection range of the ultrasonic waves transmitted from the ultrasonic sensor in response to at least one of transmission voltage, transmission frequency and transmission pulse width of the ultrasonic waves.

17. The sensor system for a vehicle according to claim 1, further comprising a driving command informing section for causing the door mirror to be folded and retracted when detecting that the vehicle is stopped.

* * * * *